(12) United States Patent
Krishnamachari

(10) Patent No.: US 6,804,356 B1
(45) Date of Patent: Oct. 12, 2004

(54) HIERARCHICAL AUTHENTICATION SYSTEM FOR IMAGES AND VIDEO

(75) Inventor: Santhana Krishnamachari, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/531,700

(22) Filed: Mar. 20, 2000

(51) Int. Cl.⁷ .................. H04N 7/137; H04N 11/04; G06K 9/62

(52) U.S. Cl. .................. 380/201; 382/232; 380/54; 380/201; 380/210; 348/571; 348/661; 348/699

(58) Field of Search ................ 380/201, 54, 210; 348/571, 661, 699; 382/232

(56) References Cited

U.S. PATENT DOCUMENTS

| | | | |
|---|---|---|---|
| 4,914,508 A | * | 4/1990 | Music et al. ........... 375/240.01 |
| 5,351,095 A | * | 9/1994 | Kerdranvat ................. 348/699 |

* cited by examiner

Primary Examiner—Ayaz Sheikh
Assistant Examiner—Taghi T. Arani

(57) ABSTRACT

A method and system for creating authentication signatures for digital images and video frames is provided. The method and system involves partitioning the image into multiple blocks, comparing characteristics from each block and generating data bits based on the comparison. Each block is then broken up into additional blocks and those blocks are compared to create additional signature bits which are combined with the signature sets from the first set of blocks. Each of these new smaller blocks can be further broken up and the procedure can be repeated to provide an authentication signature of desired length.

23 Claims, 5 Drawing Sheets

US 6,804,356 B1

HIERARCHICAL AUTHENTICATION SYSTEM FOR IMAGES AND VIDEO

BACKGROUND OF THE INVENTION

The invention relates generally to authentication systems and methods for digital images and more particularly to improved methods, systems and signals for authenticating digital images.

The use of digital images and videos by both consumers and professionals is pervasive. Accordingly, it has become important to provide a system and method for authenticating digital images and videos to insure that they have not been tampered with. As an example, an authentication system could insure that someone has not replaced a person's face with that of another on a digital picture or series of video frames.

Authentication systems are known which extract a short signature from images (or video frames) which can be either inserted into the image signal or stored separately. The owner of the original content can use the signature to verify whether the content has been modified or users can confirm that they are receiving authentic digital images.

Conventional content-based image authentication systems typically define an image into many blocks and extract characteristics about the blocks. For example, the image can be broken up into 16×16 blocks as in FIG. 1 or some other number of blocks, and some characteristic about the block, such as average luminance or chrominance values with respect to R, G, B or gray values. The characteristics of adjacent pairs of blocks are commonly compared and a signature is extracted based on this comparison. For example, if the average luminance value for the red component of a first block 110 of an image 100 is greater than or equal to that of a second block 120, a one bit will be generated. Otherwise, a zero bit will be generated. The process is repeated with successive blocks until a binary signature of ones and zeros is compiled.

A disadvantage to this method is that because pairs of blocks each contribute a bit to the signature, it is possible to change the pair of blocks without affecting the signature by maintaining the difference or similarity of the compared characteristic of each block. It can be possible to reverse engineer the signature and then alter the image in such a manner to generate an identical signature and thus frustrate the authentication mechanism.

The following references discuss processing video signals, coding image blocks and authentication algorithms for digital images, the contents of which are incorporated herein by reference: WO 93/11502, U.S. Pat. No. 4,254,400, U.S. Pat. No. 5,351,095, U.S. Pat. No. 5,520,290 and U.S. Pat. No. 5,870,471.

Techniques for performing pair-wise block comparisons in a non-hierarchical technique are discussed in "Generating robust digital signature for image/video authentication", C. Y. Lin and S. F. Chang, in Proceedings of Multimedia and Security Workshop at A. C. M. Multimedia, September 1998. Inserting and/or hiding a signature in an image signal is discussed in "Secure spread spectrum water marking for images, audio and video," I. Cox, et al., in IEEE Int'l. Conf. on Image Processing, Vol. 3, pp. 243–246 (1996). The contents of these references are incorporated herein by reference.

Accordingly, it is desirable to provide an improved method and system for authenticating digital images which overcomes drawbacks of conventional methods and systems.

SUMMARY OF THE INVENTION

Generally speaking, in accordance with the invention, a method and system for creating authentication signatures for digital images is provided. The method and system involves partitioning the image into multiple blocks, comparing characteristics from each block and generating signature data bits based on the comparison. Each block can then be broken up into additional blocks and those blocks can be compared to create additional sets of signature bits which can be combined with the signature bits from the first set of blocks. Each or a portion of these new smaller blocks can be further broken up and the procedure can be repeated to provide an authentication signature of desired length by combining all or parts of the signature segments.

Accordingly, it is an object of the invention to provide an improved method and system for authenticating digital images and video.

Another object of the invention is to provide a method of creating an authentication signature for a digital image which is difficult to duplicate if the image is altered.

Another object of the invention is to provide an improved system for creating, storing and using authentication signatures for digital images which are difficult to duplicate if the original image is altered.

The invention accordingly comprises the several steps and relation of one or more of such steps with respect to each of the others and the product, system, signal and media adapted to effect or resulting from such steps, or as is exemplified in the following detailed description and drawings and the scope of the invention will be indicated in the claims.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Authentication algorithms for digital data should be difficult to reverse engineer and should insure that it is difficult, if not impossible, to alter the image without changing the correspondence between the authentication signature and the image itself. The authentication is preferably performed in a content-based fashion and small, non-malicious changes in the image such as brightening or subjecting the image to various coding or compression algorithms, such as a lossy JPEG-like compression should be allowed. As used herein, the term image will also be used to refer to video frames.

Authentication methods and systems in accordance with the invention use a hierarchical technique, where the image is partitioned into blocks of a selected number of pixels at a first-level or scale (scale 0) and then each or a portion of the blocks are further partitioned into sub-blocks in successive scales. At each scale, the properties or characteristics of blocks (or sub-blocks) are compared to obtain a signature for that scale, and all or part of the signatures for each scale are combined. As the individual blocks are broken down into successive scales of greater detail, the authentication signature generated at each scale can be added onto or otherwise combined with the signature generated from previous scale levels to provide a more robust signature which is more difficult to reverse engineer and evade, compared to conventional mono-scale techniques.

Figure 1:
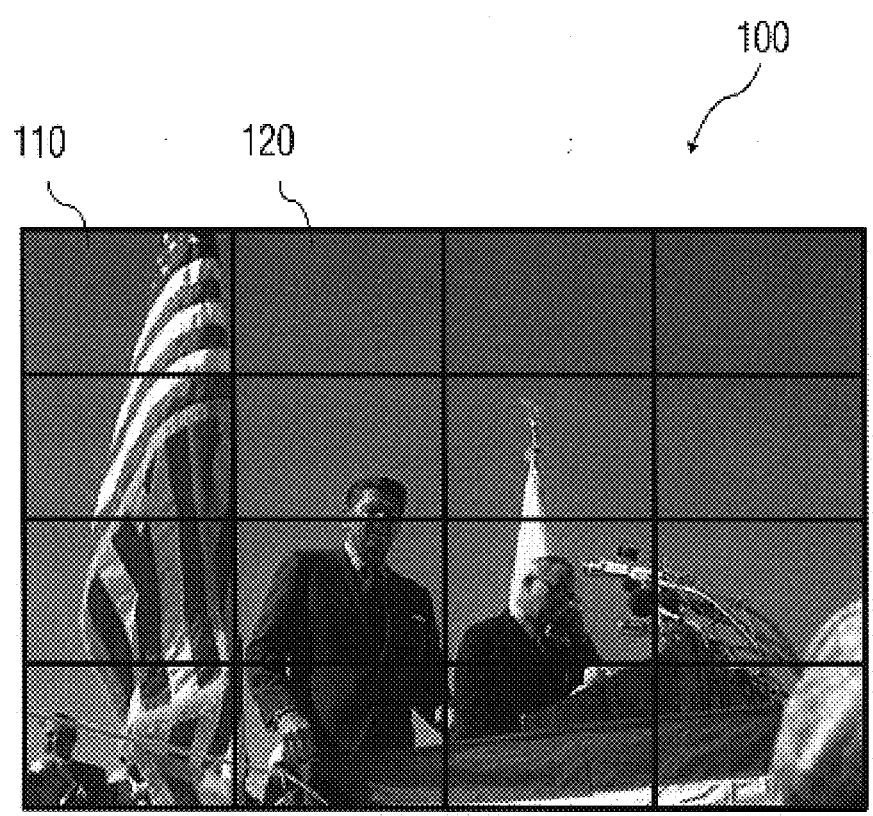
FIG. 1 represents a digital image divided into sixteen blocks.
Figures 2A, 2B:
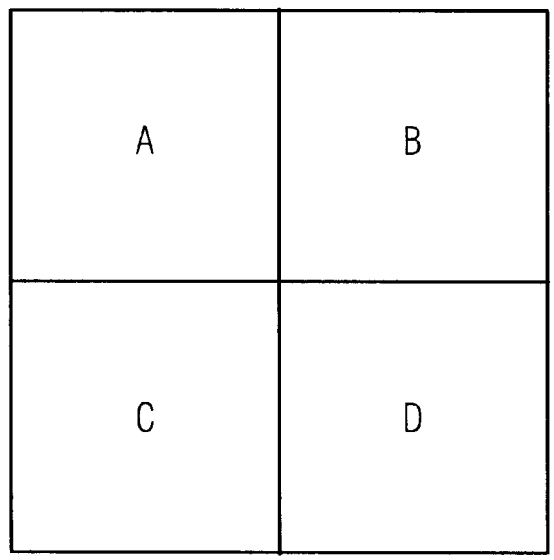
FIG. 2A represents the partition of an image into four blocks at scale zero.
FIG. 2B shows each of the blocks of FIG. 2A broken down into four sub-blocks at scale one.

Referring to FIG. 2A, as a non-limiting illustration of a technique in accordance with preferred embodiments of the invention, the image (not shown) has been partitioned into four non-overlapping blocks at scale zero. These blocks are identified as A, B, C and D. The blocks together completely cover the entire image. It is also possible, in accordance with preferred embodiments of the invention, to use overlapping blocks or blocks which cover only a portion of the image, such as when authentication is only desired for a particular section of an image. Partitioning only a portion of the image can simplify the procedure if characteristic information will only be located at a certain location of the image.

A characteristic value is extracted from each block. This characteristic can be a luminance or chrominance characteristics, and the value can be the average luminance of the R (red) value (for example) over the entire block. Other values for the characteristics, such as the standard deviation of the characteristic of the block or some other characteristic value such as DCT coefficient and the like can be used. The computed characteristic values can be identified as $f(A)$, $f(B)$, $f(C)$ and $f(D)$ where $f$ is the function used to compute the desired characteristic value.

The computed characteristic values of the four blocks can then be compared as follows. The $f()$ values can be arranged in an ascending, descending or other predefined order. Because there are four blocks, there are twenty-four possible combinations of the ordering. (e.g., ABCD, ABDC, ADBC. . . ). A five-bit binary number can be used to represent each combination in the ordering, i.e., ABCD could be assigned 00001 and CBDA might be assigned 10010. A five-bit binary number can represent 32 different combinations. The remaining eight combinations can be used for the instances where the values of some of the $f()$ characteristics are equal. For example, if the four values are all equal, e.g., if the average green level of each block is identical, then a particular 5-bit number such as 11111 can be used to specify that particular combination. Thus, a 5-bit number is obtained at scale 0 (level 1) to form a part of the authentication signature.

Although four blocks are shown in this embodiment of the invention, different numbers of blocks and sub-blocks can be used in alternate embodiments of the invention. Also, the number of sub-blocks, to which a block (or sub-block) is divided need not be identical to the number of blocks or sub-blocks of a higher scale. If the number of blocks is greater than four, then the number of bits used to represent all of the combination will be greater than five.

Referring to FIG. 2B, each of the four blocks from scale 0 (FIG. 2A) are partitioned into four non-overlapping sub-blocks designated AA, AB and so forth. (As noted above, each of the blocks of FIG. 2A could have been divided into two sub-blocks, nine sub-blocks and so forth.) The partitioning of the image as shown in FIG. 2B represents scale 1 in the hierarchical decomposition. The characteristic values of each of blocks AA, AB, AC and AD are computed as discussed above and a 5-bit binary number is obtained for the four groups of sub-blocks of the scale 0 blocks. In alternate embodiments of the invention, different characteristics from those used a scale 0 can be used in each of the additional scales.

After the characteristic values of sub-blocks AA, AB, AC and AD are computed, a 5-bit binary number is obtained. The same process is repeated for the three other sets of sub-blocks at scale 1, resulting in four 5-bit numbers or 20 bits. These 20 bits are combined with the first 5-bit number and the process can be repeated successively for additional sets of sub-blocks at higher scales. The bits obtained from successive scales are concatenated to obtain a signature. For example, if four scales are used, then 5-bits are obtained from scale 0, 20-bits from 1, 80-bits from scale 2, and 320-bits from scale 3. All of these bits are concatenated to form a 425-bit level 4 authentication signature.

In alternate embodiments of the invention, the authentication signature can be obtained for a first color band and then similar signatures can be obtained for the additional color bands. The number of scales used would depend on the size of the image and the desired length of the signature.

The signature can be stored separately or sent with the image signal and transmitted with the signal or stored on a floppy disk, CD, DVD, video tape and the like.

Figure 5:
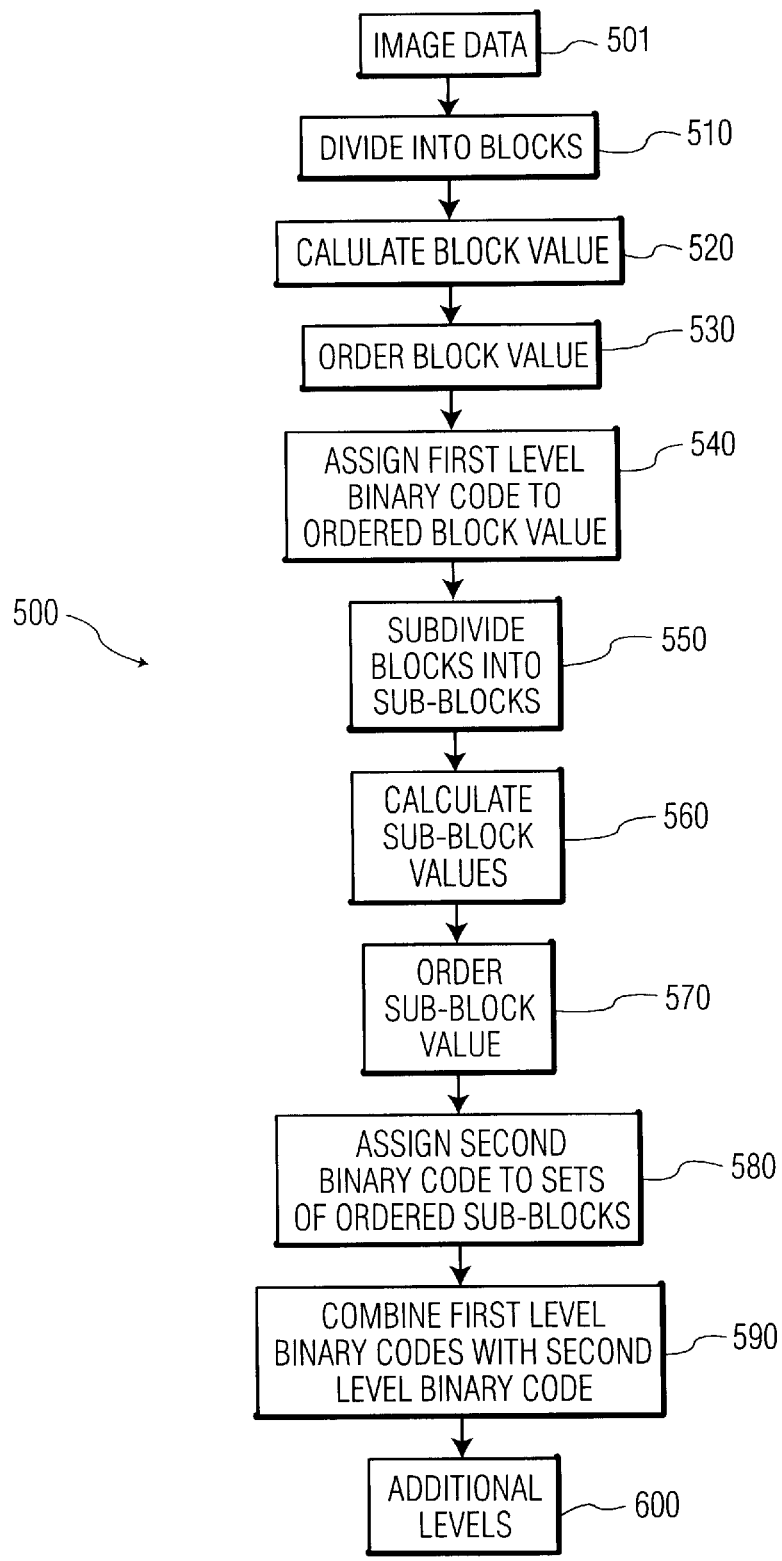
FIG. 5 is a flow chart of an authentication method in accordance with an embodiment of the invention.

A flow chart 500 corresponding to an authentication method in accordance with preferred embodiments of the invention is shown generally in FIG. 5. In step 510, image data 501 is divided into blocks. In step 520, values corresponding to characteristics of each block are calculated. In step 530, the blocks are ordered based on the values and in step 540, a first-level binary code corresponding to the order of the blocks is assigned. In step 550, each block from the first-level (scale 0) is subdivided into sub-blocks. In step 560, values for each sub-block are calculated and in step 570, the sub-blocks are ordered based on these values. In step 580, sets of binary codes corresponding to the ordered sets of sub-blocks are generated and in step 590, the binary code is combined with the first-level binary code. In step 600, the process can be repeated and additional levels (scales) of authentication signature binary code can be developed.

Figure 3:
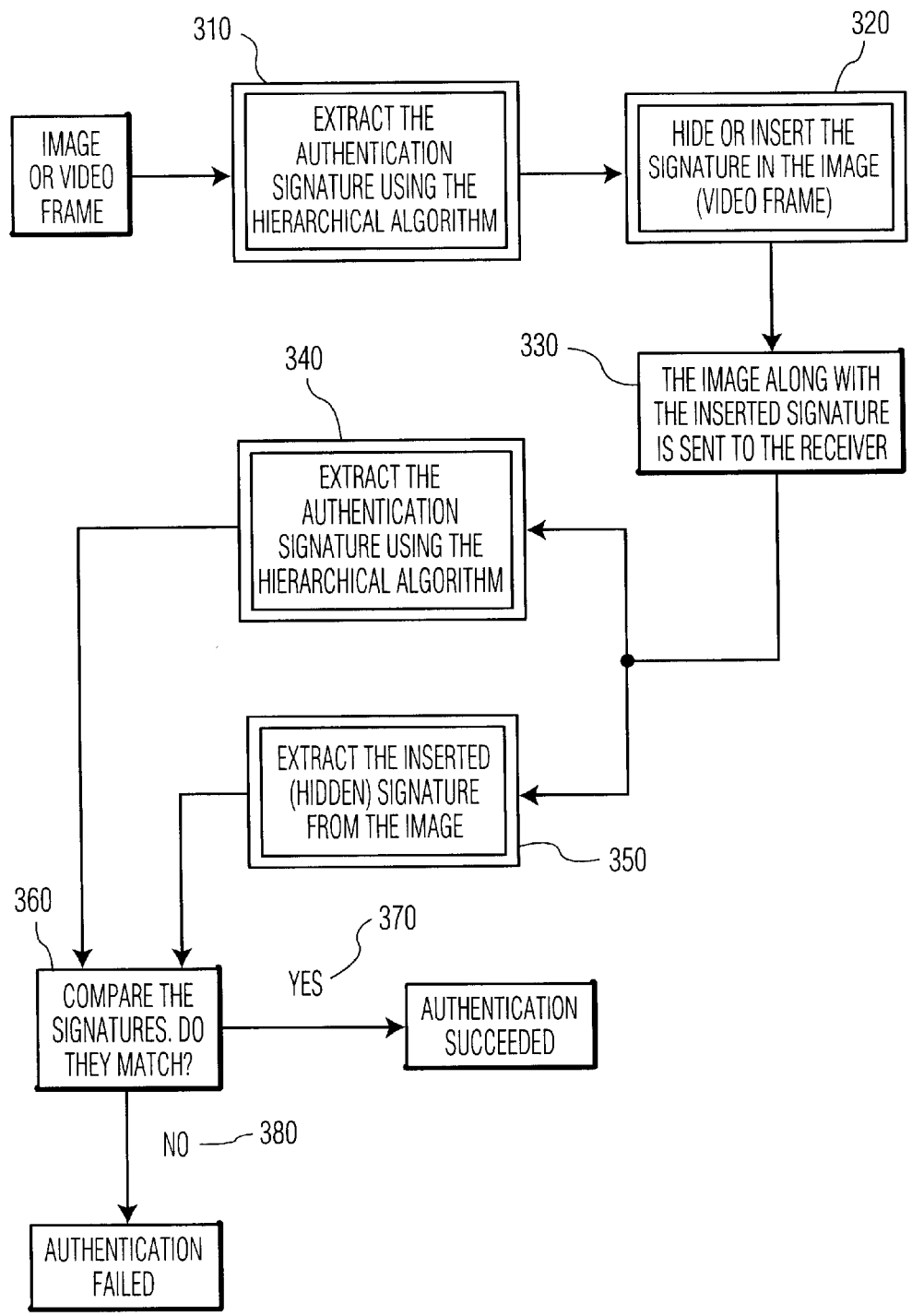
FIG. 3 is a flow chart of an authentication method in accordance with an embodiment of the invention.
Figure 4:
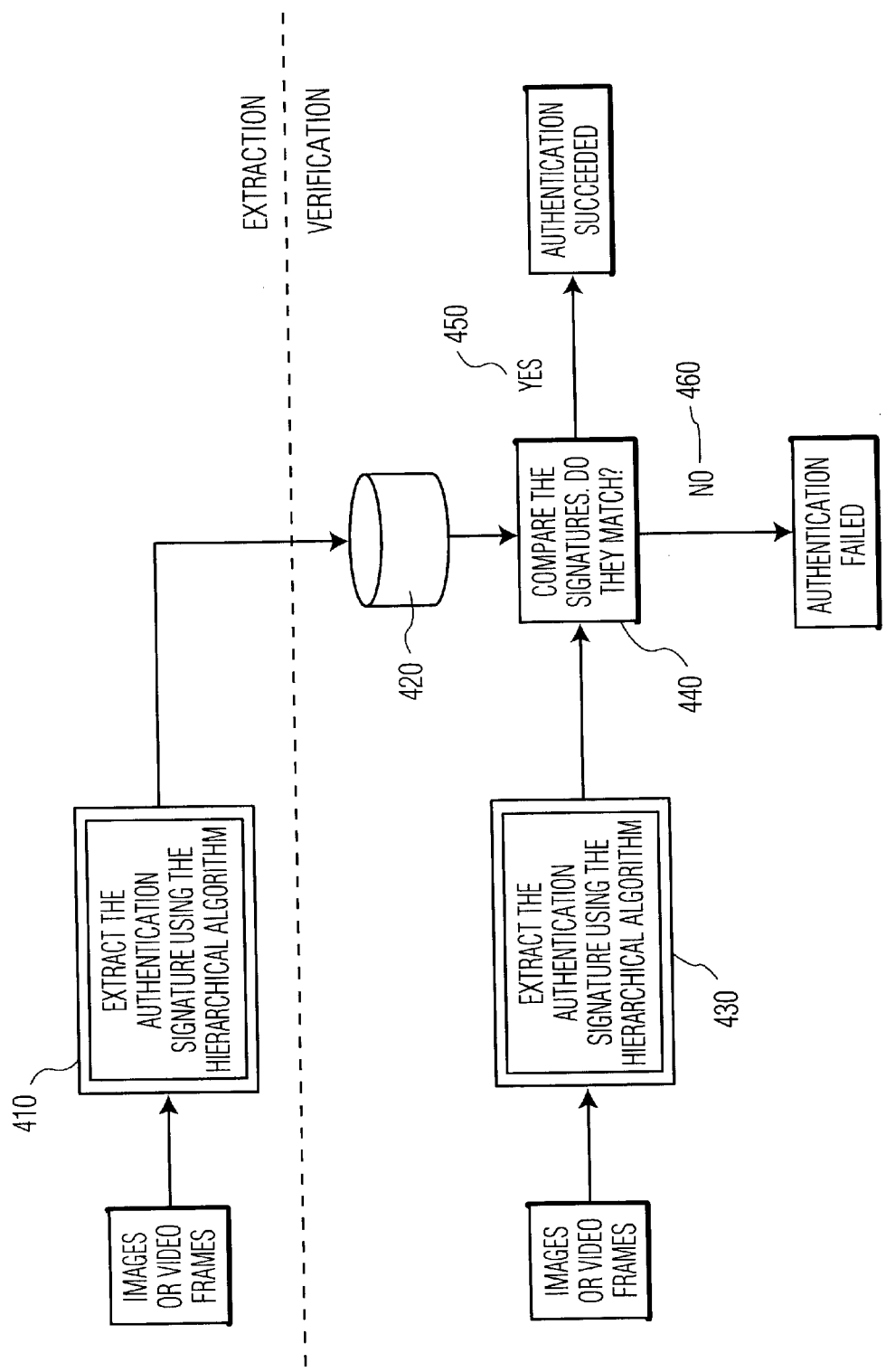
FIG. 4 is a flow chart of an authentication method in accordance with another embodiment of the invention.

Non-limiting uses of the signature obtained in accordance with preferred embodiments of the invention are illustrated in FIGS. 3 and 4.

Referring to FIG. 3, a data processor can be used to extract the authentication signature from image data using hierarchical algorithms discussed above in step 310. In step 320 the signature of the image or video frame can be inserted into or added to the signal representing the image. In step 330 the image together with the inserted signature can be transmitted to an image receiver.

In step 340, the authentication signature can be extracted from the image data using the hierarchical algorithm. In step 350, the inserted (hidden) signature from the image is extracted.

In step 360, the signature generated from the transmitted signal is compared to the signature inserted with the image. If they match, authentication is acknowledged in step 370. If they do not match, authentication failure is indicated in step 380.

Referring to FIG. 4, a method of authentication is illustrated where the signature is not inserted into the image signal. In step 410 the authentication signature of an image or video frame is extracted using a hierarchical algorithm in accordance with the invention. In step 420, this signature is stored at a secure location. When verification is desired, in step 430, the authentication signature is extracted from the image or video frame using the hierarchical algorithm. In step 440, the signature is compared to that stored during step 420 and if they match, authentication is acknowledged in step 450. Otherwise, authentication failure is noted in step 460.

What is claimed is:

1. A method of creating an authentication signature corresponding to an image, comprising:
   partitioning at least a portion of an image into a selected number of first-level blocks of image information;
   determining a first-level block value corresponding to a characteristic of the portion of the image contained in each first-level block;
   processing the first-level block values for the first-level blocks and generating a first-level signature segment based on the first-level block values as a result of such processing;
   subdividing each first-level block into a selected number of second-level sub-blocks;
   determining a second-level sub-block value corresponding to a characteristic of the portion of the image contained in each second-level sub-block;
   processing the second-level block values for the second-level sub-blocks and generating a second-level signature segment based on the second-level block values as a result of such processing; and
   combining at least a portion of the second-level signature segment with at least a portion of the first-level signature segment.

2. The method of claim 1, wherein the characteristic of the image is based on chrominance or luminance values for the blocks or sub-blocks.

3. The method of claim 1, wherein the first-level signature segment is generated by ordering the blocks based on the first-level block value for each block and generating a binary code corresponding to the order of the blocks.

4. The method of claim 3, wherein the second-level signature segment is generated by ordering the sub-blocks based on the second-level value for each sub-block and generating binary codes corresponding to the ordered sub-blocks and the binary codes corresponding to the second-level signature segment are combined with the binary code corresponding to the first-level signature segment.

5. The method of claim 1, wherein there are four first-level blocks which are each divided into four second-level sub-blocks.

6. The method of claim 3, wherein there are four-level blocks which are each divided into four second-level sub-blocks.

7. The method of claim 6, wherein the order of the four first-level blocks are assigned a 5-digit binary code.

8. The method of claim 7, wherein the second-level signature is generated by ordering the sub-blocks based on the second-level sub-block values and assigning 5-digit binary codes to groups of four sub-blocks.

9. The method of claim 8, wherein the blocks are ordered in ascending or descending order of the first-level block values and second-level block values.

10. The method of claim 9, wherein selected binary codes for the signature segment are assigned when the first-level block values or second-level block values of two or more blocks or sub-blocks are equal.

11. The method of claim 1, wherein at least a portion of the second-level sub-blocks are subdivided into a selected number of third-level sub-blocks, third level signature segments are generated from the third-level, sub-blocks and the third-level signature segments are combined with the first and second-level signature segments.

12. A method of creating an authentication signature corresponding to an image, comprising:
   partitioning at least a portion of an image into a selected number of first-level blocks of image information;
   determining a first-level block value corresponding to a characteristic of the portion of the image contained in each first-level block;
   ordering the blocks based on the first-level block values for the first-level blocks and generating a first-level signature segment corresponding to the resulting order;
   subdividing each first-level block into a selected number of second-level sub-blocks;
   determining a second-level sub-block value corresponding to a characteristic of the portion of the image contained in each second-level sub-block;
   ordering the sub-blocks based on the second-level block values and generating a second-level signature segment corresponding to the order of the sub-blocks; and
   combining the second-level signature segment with the first-level signature segment.

13. The method of claim 12, wherein there are four blocks and the first level signature segment is a 5 bit binary code.

14. The method of claim 13, wherein each block is divided into four sub-blocks and each of the four sub-blocks is assigned a 5 bit binary code and the four five bit codes are combined to form the second-level signature segment.

15. A system for providing an authentication signature corresponding to a digital image, comprising:
   a data processor to receive data representing an image; partition at least a portion of the image into a selected number of first level blocks of image information; determine first-level block values corresponding to a characteristic of the portion of the image contained in each first-level blocks; process the first-level block values for the first-level blocks; generate a first-level signature segment as a result of such processing; subdivide each first-level block into a selected number of second-level sub-blocks; determine a second-level sub-block value corresponding to a characteristic of the portion of the image contained in each second-level sub-block; and process the second-level block values for the second-level sub-blocks and generate a second-level signature segment as a result of such processing; and
   combining at least a portion of the second-level signature segment with at least a portion of the first-level signature segment.

16. The system of claim 15, wherein the data processor determines the first level block value based on chrominance or luminance values for the blocks or sub-blocks.

17. The system of claim 15, wherein the data processor subdivides at least some of the second-level sub-blocks into a selected number of third-level sub-blocks and generate signature segments based on the third-level sub-blocks.

18. A system for creating an authentication signature corresponding to an image, comprising:
   a data processor to receive data representing an image; partition at least a portion of an image into a selected number of first-level blocks of image information; determine a first-level block value corresponding to a characteristic of the portion of the image contained in each first-level block; order the blocks based on the first-level block values for the first-level blocks; generate a first-level signature segment corresponding to the resulting order; subdivide each first-level block into a selected number of second-level sub-blocks; determine a second-level sub-block value corresponding to a characteristic of the portion of the image contained in each second-level sub-block; order to the sub-blocks based on the second-level block values; generate a second-level signature segment corresponding to the order of the sub-blocks; and combine the second-level signature segment with the first-level signature segment.

19. The system of claim 18, wherein the data processor divides the image into four blocks and create a 5 bit binary code as the first level signature segment.

20. The system of claim 19, wherein the data processor divides each block into four sub-blocks and each of the four sub-blocks is assigned a 5 bit binary code and the four five bit codes are combined to form the second-level signature segment.

21. A method for storing data on a data storage medium, the data representing an image and a signature corresponding to the image, comprising: partitioning at least a portion of an image into a selected number of first-level blocks of image information; determining a first-level block value corresponding to a characteristic of the portion of the image contained in each first-level block; processing the first-level block values for the first-level blocks and generating a first-level signature segment based on the first-level block values as a result of such processing; subdividing each first-level block into a selected number of second-level sub-blocks; determining a second-level sub-block value corresponding to a characteristic of the portion of the image contained in each second-level sub-block; processing the second-level block values for the second-level sub-blocks and generating a second-level signature segment based on the second-level block values as a result of such processing; and combining the second-level signature segment with the first-level signature segment.

22. The method of claim 21, wherein the medium is selected from the group consisting of floppy disks, DVDs, video cassettes, and CDs.

23. An image authentication system, comprising:

providing a first image;

generating an authentication signature by a first method comprising partitioning at least a portion of an image into a selected number of first-level blocks of image information; determining a first-level block value corresponding to a characteristic of the portion of the image contained in each first-level block; processing the first-level block values for the first-level blocks and generating a first-level signature segment based on the first-level block values as a result of such processing; subdividing each first-level block into a selected number of second-level sub-blocks; determining a second-level sub-block value corresponding to a characteristic of the portion of the image contained in each second-level sub-block; processing the second-level block values for the second-level sub-blocks and generating a second-level signature segment based on the second-level block values as a result of such processing; and combining the second-level signature segment with the first-level signature segment;

providing a second image which may be identical to the first image;

generating a second signature for the second image by the first method; and comparing the first signature to the second signature.

* * * * *